United States Patent [19]
Garibay, Jr. et al.

[11] Patent Number: 5,752,274
[45] Date of Patent: May 12, 1998

[54] ADDRESS TRANSLATION UNIT EMPLOYING A VICTIM TLB

[75] Inventors: Raul A. Garibay, Jr., Richardson; Marc A. Quattromani; Douglas Beard, both of Allen, all of Tex.

[73] Assignee: Cyrix Corporation, Richardson, Tex.

[21] Appl. No.: 336,030

[22] Filed: Nov. 8, 1994

[51] Int. Cl.$^6$ .................................................. G06F 12/00
[52] U.S. Cl. .................................. 711/206; 711/122
[58] Field of Search ............................. 395/416, 417, 395/418, 449; 711/206, 207, 208, 122

[56] References Cited

U.S. PATENT DOCUMENTS

| | | | |
|---|---|---|---|
| 5,261,066 | 11/1993 | Jouppi et al. | 395/449 |
| 5,555,395 | 9/1996 | Parks | 395/472 |
| 5,574,877 | 11/1996 | Dixit et al. | 395/417 |

OTHER PUBLICATIONS

Cyrix 6x86™ Processor Data Book, Cyrix Corporation, pp. 1–14 to 1–15 and 2–45 to 2–52, 1996.

Norman P. Jouppi : Improving Direct–Mapped Cache Performance by the Addition of a Small Fully–Associative Cache and Prefetch Buffers. The 17th Annual International Symposium on Computer Architecture.

Primary Examiner—David L. Robertson
Attorney, Agent, or Firm—Andrew S. Viger; John L. Maxin

[57] ABSTRACT

An address translation unit is disclosed employing a direct-mapped translation lookaside buffer and a relatively small, associative victim translation lookaside buffer for translating linear addresses to physical addresses expediently and avoiding thrashing, without requiring large amounts of hardware and space.

14 Claims, 8 Drawing Sheets

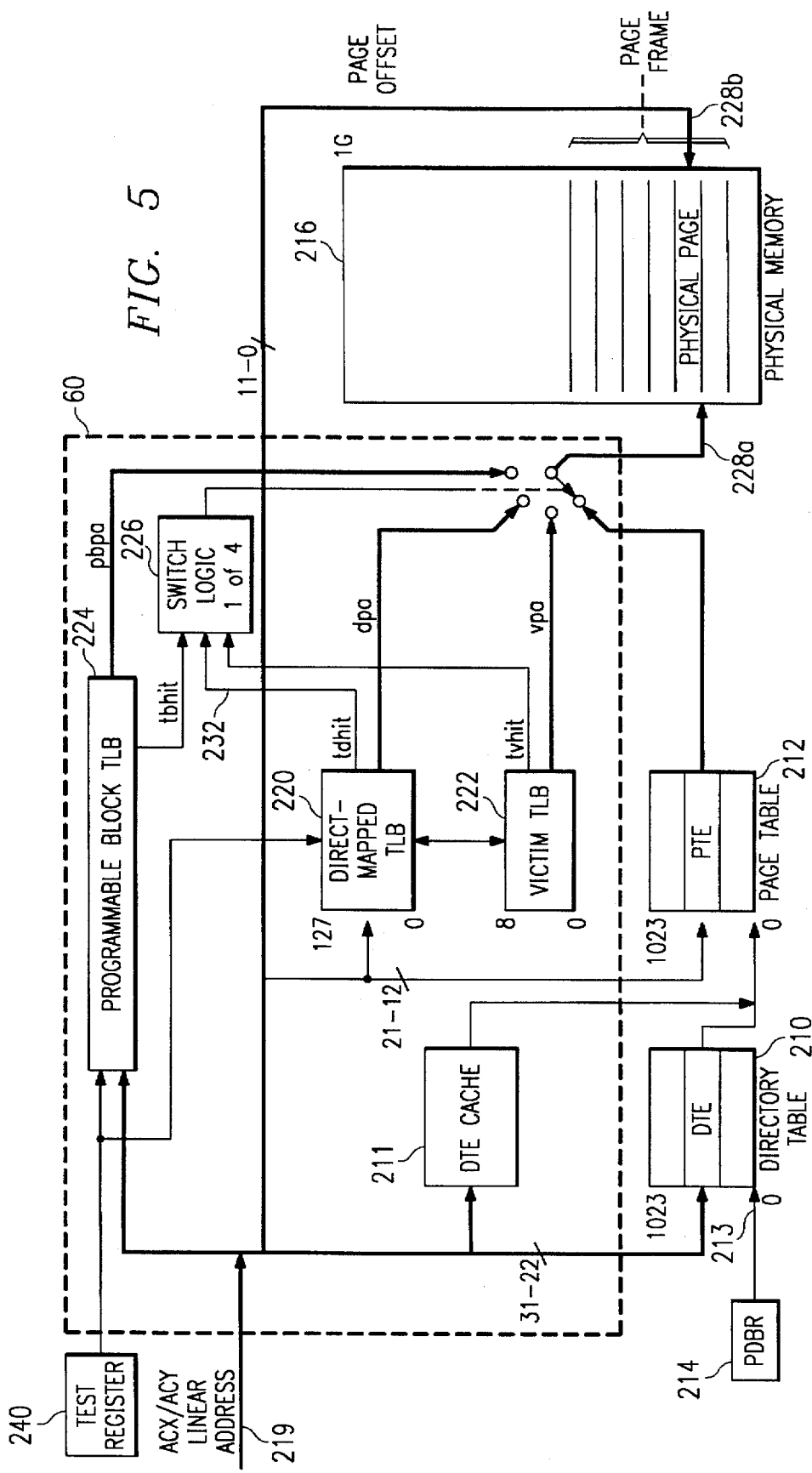

ADDRESS TRANSLATION UNIT EMPLOYING A VICTIM TLB

CROSS-REFERENCE TO RELATED APPLICATIONS

This application is related to U.S. application Ser. No. 08/857,300 which is a file wrapper continuation application of Ser. No. 08/336,148 (CX00208) entitled "Address Translation Unit Employing Programmable Page Size" filed contemporaneously herewith and assigned to the assignee of the present invention.

BACKGROUND OF THE INVENTION

1. Field of the Invention

The invention relates generally to computer systems, more particularly to virtual memory addressing, and even more particularly to improved systems and methods for address translation.

2. Description of Related Art

Without limiting the scope of the invention, this background information and definitions provided herein are in the context of a specific problem to which the invention has application.

DEFINITIONS

An "operating system" is an underlying supervisory program which runs on a computer system, typically transparent to the system user, for handling routine tasks such as memory management.

A "page" is a minimum size block of information in a virtual memory system which is swapped between primary memory (e.g. RAM) and a secondary memory (e.g. disk drive), typically under the control of the operating system.

An "exception" is an abnormal or uncommon event occurring in the computer system intended to signal it to perform a task, typically to service the exception.

A "page fault" is a particular type of exception which is generated when a requested virtual address is not in primary memory.

A "translation lookaside buffer" (TLB) is a particular type of cache that stores physical addresses of the most recently used pages.

"Thrashing" is an undesirable event that occurs when a page is frequently swapped between primary and secondary memories.

So-called "virtual memory addressing" is a well known technique whereby large address spaces are emulated with relatively small, but fast memory (such as RAM) and relatively large, but slow secondary memory (such as a disk drive). Historically, virtual memory addressing was performed because fast memory was far too cost prohibitive to support large address spaces. The most common way of implementing virtual memory addressing in a computer system is by swapping minimum sized blocks of information known as "pages" into and out of RAM from a disk drive under the control of the operating system when a requested address is not located within the primary or "physical" memory.

The requested address (referred to as the "virtual" or "linear" address) is either translated to a corresponding "physical" address in RAM or causes an exception to be generated known as a "page fault" if the required address falls in a memory location defined by a page not currently in RAM. When the operating system services the page fault, typically some form of "least recently used" (LRU) technique is used to expunge that page from RAM, load the required page, and restart the address request. In the x86 architecture, the page size is fixed at 4 Kilobytes and aligned on 4 Kilobyte boundaries.

Referring now to FIG. 10, a two-level page table addressing technique is described in the context of the x86 architecture. Bits 31–22 of the thirty-two bit linear address are used to locate an entry in a directory table 210. The directory table 210 is a master index for up to one thousand twenty four individual second-level page tables. The selected entry in the directory table 210, referred to as the directory table entry (DTE), identifies the starting or "base" address 211 of a second-level page table 212. The directory table 210 is typically four Kilobytes in size, holding one thousand twenty four—four-byte DTEs, and is itself a page and therefore aligned to a four Kilobyte boundary. Each DTE has twenty bits which define the page table (base) address and twelve bits which define attributes, some of which are unused, described in more detail hereinbelow. The base address 213 of the directory table 210 is stored in a page directory base register (PDBR) 214.

Bits 21–12 of the thirty-two bit linear address offset the base address 211, to locate a thirty-two bit entry, referred to as the page table entry (PTE), in the second-level page table 212. The page table 212 addresses up to one thousand twenty four individual page frames and is four Kilobytes in size, holding one thousand twenty four—four-byte PTEs, and is itself a page aligned to a four Kilobyte boundary. Each PTE has twenty bits which define a desired page frame 215 within physical memory (RAM) 216 and twelve bits which define attributes, some of which are unused, described in more detail hereinbelow.

Bits 11–0 of the thirty-two bit linear address, referred to as the page offset, locate the desired physical memory address within the page frame 215 pointed to by the PTE. Since the directory table 210 can point to one thousand twenty four page tables, and each page table can point to one thousand twenty four of page frames, a total of one megabytes of page frames are realized. Since each page frame 215 contains four Kilobytes of physical memory addresses (a page offset of twelve bits), up to four Gigabytes of virtual memory can be addressed.

The directory table 210, page table 212, and physical memory 216, can reside wholly or in part, in cache or external memory.

Reference is now made to FIG. 4 which illustrates in more detail, the DTE and PTE of FIG. 10. Each DTE and PTE contains a twenty bit base address (bits 31–12) of either the page table 212 or the page frame 213 respectively, as well as twelve other attribute bits (bits 11–0). A present bit (P) (bit 0) is set in the DTE to indicate that the requested page table 212 is present and therefore the appropriate PTE can be read. The P bit is also set in the corresponding PTE to indicate that the page is in physical memory 216. Accessed (A) and dirty (D) bits, bits 5 and 6 respectively, are updated upon a hit, if necessary, and the information is fetched from physical memory 216. Accessed (A) bits in both the DTE and the PTE are set, if necessary, to indicate that the directory table 210 and page table 212 have been used to translate a linear address. The dirty (D) bit in the DTE and PTE are set before the first write is made to a page. Both present bits are set to validate the remaining bits in the DTE and PTE. If either of the present bits are not set, a page fault is generated when either the DTE or PTE is accessed. If the P bit is not set, the remaining DTE/PTE bits are available for use by the operating system, for example, to record the address on the hard disk where the page is located. A page fault is also generated if the memory reference violates the page protection attributes set in bits 1–4. The details of these attribute bits are not necessary for the understanding of the present invention but are mentioned for completeness. A more complete explanation can be found in the CX486DX/DX2 data book, order number 94113-01, from Cyrix Corporation, Richardson, Tex., herein incorporated by reference.

The two-level table access described above is sometimes referred to as "tablewalking". Tablewalking is time intensive because for a two level page table, it requires at least three memory cycles namely; one for fetching the DTE, one for fetching the PTE, and one for fetching the contents of the requested address in physical memory. Occasionally, this access latency can be avoided with the use of a translation lookaside buffer (TLB) 218. The TLB 218 contains "tags" (i.e. copies of the most recently accessed linear addresses) along with their corresponding physical addresses. The TLB 218 replaces tablewalking, thus reduces memory cycles, when a desired linear address matches "hits" with one of the tags stored within it. Accordingly, the TLB 218 can immediately map the linear address to the physical address without doing a tablewalk.

In choosing the design of the TLB 218, tradeoffs must be made to accommodate speed, size, and power constraints. More specifically, it is most desirable to have the fastest possible access to the TLB 218 since address translation is crucial for continued program execution. It is well recognized that a direct mapped, rather than a N-way set associative or fully set associative TLB, has the most expedient access and the most efficient storage per unit area. Conversely, it is also recognized that a direct mapped configuration forfeits associativity leading to more thrashing in the TLB 218 due to aliasing.

Similarly, while N-way set associative or fully set associative TLBs are by definition more associative, they are slower than direct-mapped TLBs and need more circuit area because of the multiple comparators required and the overhead connected with comparing all the tags within a set.

In the context of improving cache performance, Jouppi, Norman P., in *Improving Direct-Mapped Cache Performance by the Addition of a Small Fully-Associative Cache and Prefetch Buffers*. The 17th Annual International Symposium on Computer Architecture, IEEE Computer Society Press, May, 1990. pp. 364–373, has suggested "victim caching" for loading a small fully-associative cache with the victims of eviction from a direct-mapped cache. However, there is no teaching or suggestion in Jouppi of utilizing victim caching in a TLB for address translation or how to handle the attendant coherency issues.

From the foregoing, it can be seen that there is a need for an address translation unit which is expedient to access, has variable associativity, and maintains coherency.

SUMMARY OF THE INVENTION

To overcome the limitations in the prior art described above, and to overcome other limitations that will become apparent upon reading and understanding the present specification, the present invention discloses an address translation unit employing a direct-mapped TLB along with an associative victim TLB. The address translation unit is biased to receive physical addresses from the direct-mapped TLB unless a miss occurs. If the direct-mapped TLB signals a miss and the victim TLB signals a hit, the victim TLB delivers the physical address to both the physical address bus and to the direct-mapped TLB. The direct-mapped TLB swaps its physical address which is to be replaced with that which hit in the victim TLB. In the case of a write to the page directory base register, coherency is maintained in the direct-mapped TLB and the victim TLB by entirely invalidating both. In the case of a single entry invalidation (INVLPG instruction), only the single entry in either the direct mapped TLB or the victim TLB is invalidated if it resides therein.

A feature of the present invention is address translation with the speed of a direct mapped TLB along with the associativity of an N-way set associative TLB.

Another feature of the present invention is maintaining coherency between the direct mapped TLB and the victim TLB without much overhead.

These and various other objects, features, and advantages of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described specific examples of systems and methods in accordance with the invention.

BRIEF DESCRIPTION OF THE DRAWINGS

Referring now to the drawings in which like reference numerals and letters indicate corresponding elements throughout the several views:

FIG. 1b illustrates a block diagram of the instruction pipeline in the microprocessor depicted in FIG. 1a;

FIG. 4 illustrates the DTE and PTE of FIG. 10 in more detail;

FIG. 5 illustrates an exemplary address translation unit practiced in accordance with the present invention;

DESCRIPTION OF THE PREFERRED EMBODIMENT

In the following description of the preferred embodiment, reference is made to the accompanying drawings which form a part hereof, and in which is shown by way of illustration specific embodiment(s) in which the invention may be practiced. It is to be understood that other embodiments may be utilized and structural changes may be made without departing from the scope of the present invention.

The detailed description of an exemplary embodiment of an address translation unit employing programmable page sizing is organized as follows:

1. Exemplary Processor System
    1.1 Microprocessor
    1.2 System
2. Generalized Pipeline Flow
3. Programmable Page Size Address Translation Unit
    3.1. Direct mapped TLB
    3.2. Victim TLB
    3.3. Programmable Block TLB
4. Conclusion This organizational outline, and the corresponding headings, are used in this Detailed Description for convenience of reference only. Detailed descriptions of conventional or known aspects of microprocessor systems are omitted so as to not obscure the description of the invention with unnecessary detail. In particular, certain terminology related to the x86 computer architecture (such as register names, signal nomenclature, etc.) is known to practitioners in the field of microprocessor design.

1. Exemplary Processor System

Figure 1A:
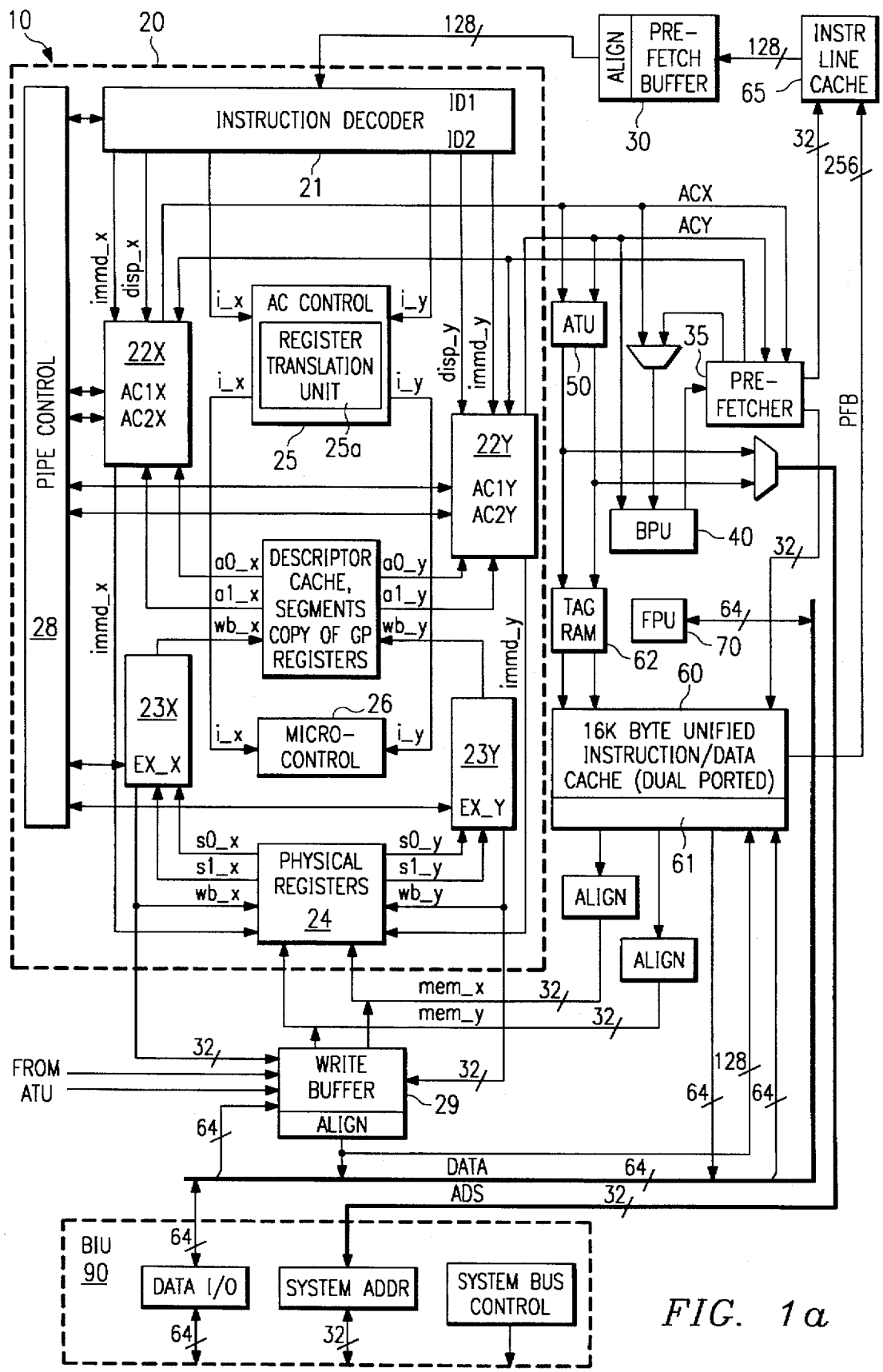
FIG. 1a illustrates a block diagram of an exemplary microprocessor practiced in accordance with the principles of the present invention.
Figure 1B:
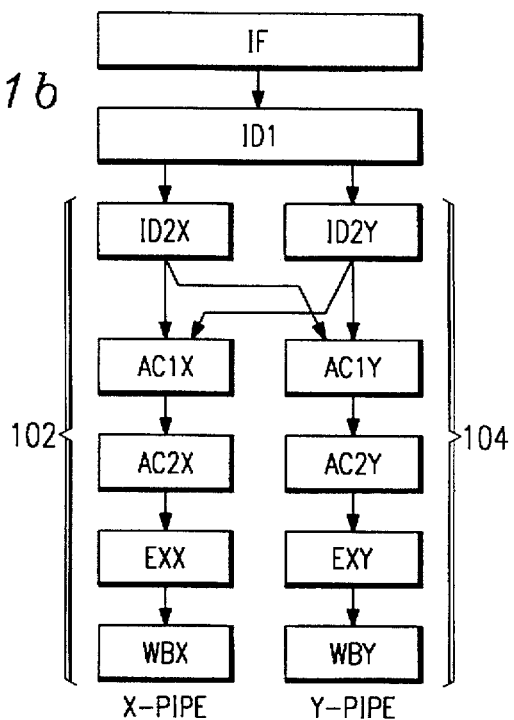
Figure 2:
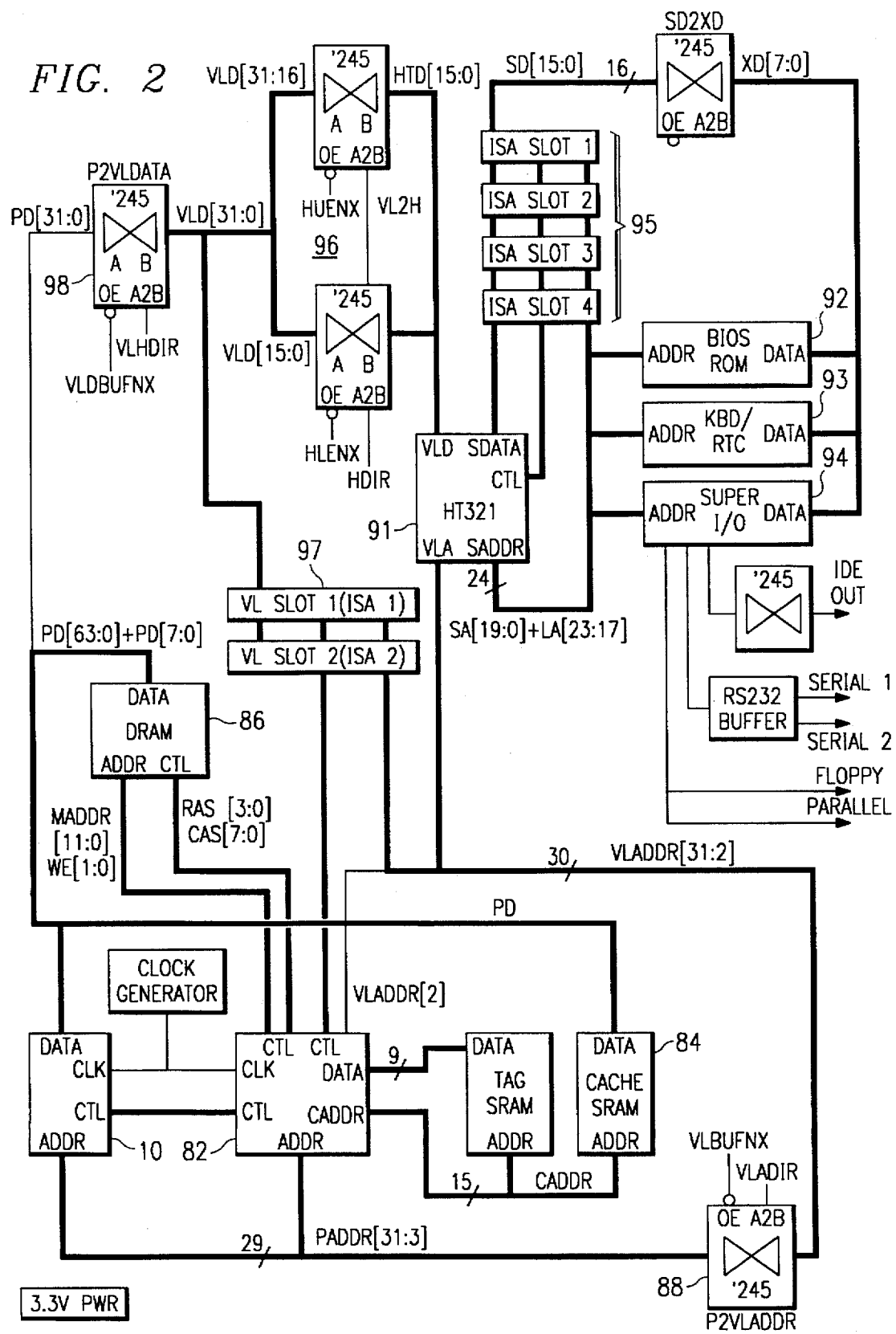
FIG. 2 illustrates a block diagram of an exemplary computer system having the microprocessor of FIG. 1, practiced in accordance with the principles of the present invention.

The exemplary processor system is shown in FIGS. 1a and 1b, and FIG. 2. FIGS. 1a and 1b respectively illustrate the basic functional blocks of an exemplary super-scalar, super-pipelined microprocessor along with the pipe stages of two execution pipelines, practiced in accordance with the principles of the present invention. FIG. 2 illustrates an exemplary processor system (motherboard) design using the microprocessor.

1.1. Microprocessor

Referring to FIG. 1a, the major sub-blocks of a microprocessor 10 include: a CPU core 20, prefetch buffer 30, prefetcher 35, branch processing unit (BPU) 40, address translation unit (ATU) 50, and unified 16 Kilobyte code/data cache 60, including TAG RAM 62. A two hundred fifty six byte instruction line cache 65 provides a primary instruction cache to reduce instruction fetches to the unified cache 60, which operates as a secondary instruction cache. An onboard floating point unit (FPU) 70 executes floating point instructions issued to it by the CPU core 20.

The microprocessor 10 uses internal thirty-two bit address and sixty-four bit data buses ADS and DATA, respectively. A two hundred fifty six bit (thirty-two byte) prefetch bus PFB, corresponding to the thirty-two, thirty-two byte line size of the unified cache 60 and the instruction line cache 65, allows a full line of thirty-two instruction bytes to be transferred to the instruction line cache 65 in a single clock. External interface to the ADS and DATA buses is through a bus interface unit (BIU) 90.

The unified cache 60 is four-way set associative (with a four Kilobyte set size), using a pseudo-LRU replacement algorithm, with write-through and write-back modes. It is dual ported (through banking) to permit two memory accesses (data read, instruction fetch, or data write) per clock. The instruction line cache 65 is a fully associative, lookaside implementation (relative to the unified cache), using an LRU replacement algorithm.

The FPU 70 includes a load/store stage with four-deep load and store queues, a conversion stage (thirty-two bit to eighty bit extended format), and an execution stage. Loads are controlled by the CPU core 20, and cacheable stores are directed through the write buffers 29 (i.e., a write buffer is allocated for each floating point store operation).

The CPU core 20 is a super-scalar design with two execution pipes X 102 and Y 104 (FIG. 1b). It includes an instruction decoder 21, address calculation units 22X and 22Y, execution units 23X and 23Y, and a register file 24 with thirty-two, thirty-two bit registers. An AC control unit 25 includes a register translation unit 25a with a register scoreboard and register renaming hardware. A microcontrol unit 26, including a microsequencer and microROM, provides execution control.

Writes from CPU core 20 are queued into twelve thirty-two bit write buffers 29—write buffer allocation is performed by the AC control unit 25. These write buffers provide an interface for writes to the unified cache—noncacheable writes go directly from the write buffers to external memory. The write buffer logic supports optional read sourcing and write gathering.

A pipe control unit 28 controls instruction flow through the execution pipes, including keeping the instructions in order until it is determined that an instruction will not cause an exception, squashing bubbles in the instruction stream, and flushing the execution pipes behind branches that are mispredicted and instructions that cause an exception. For each stage, the pipe control unit 28 keeps track of which execution pipe contains the earliest instruction, and provides a stall output and receives a delay input.

Referring to FIG. 1b, the microprocessor 10 has seven-stage X and Y execution pipelines 102 and 104 namely: instruction fetch (IF), two instruction decode stages (ID1, ID2), two address calculation stages (AC1 and AC2), execution (EX), and write-back (WB). Note that the complex instruction decode ID and address calculation AC pipe stages are super-pipelined.

The IF stage provides a continuous code stream into the CPU core 20. The prefetcher 35 fetches sixteen bytes of instruction data into the prefetch buffer 30 from either the (primary) instruction line cache 65 or the (secondary) unified cache 60. BPU 40 is accessed with the prefetch address, and supplies target addresses to the prefetcher for predicted changes of flow, allowing the prefetcher to shift to a new code stream in one clock.

The ID1 and ID2 decode stages decode the variable length x86 instruction set. The instruction decoder 21 retrieves sixteen bytes of instruction data from the prefetch buffer 30 each clock. In ID1, the length of two instructions is decoded (one each for the X and Y execution pipes) to obtain the X and Y instruction pointers—a corresponding X and Y bytes-used signal is sent back to the prefetch buffer 30 (which then increments for the next sixteen byte transfer).

Also in ID1, certain instruction types are determined, such as changes of flow, and immediate and/or displacement operands are separated. The ID2 stage completes decoding the X and Y instructions, generating entry points for the microROM and decoding addressing modes and register fields.

During the ID stages, the optimum pipe for executing an instruction is determined, and the instruction is issued into that pipe. Pipe switching allows instructions to be switched from ID2x to AC1y, and from ID2y to AC1x. In the exemplary embodiment, certain instructions are issued only into the X pipeline, namely: change of flow instructions, floating point instructions, and exclusive instructions. Exclusive instructions include: any instruction that may fault in the EX pipe stage and certain types of instructions such as protected mode segment loads, string instructions, special register access (control debug, test), Multiply/Divide, Input/Output, PUSHA/POPA, and task switch. Exclusive instructions are able to use the resources of both pipes because they are issued alone from the ID stage (i.e., they are not paired with any other instruction). Except for these issue constraints, any instructions can be paired and issued into either the X or Y pipe.

The AC1 and AC2 address calculation stages calculate addresses for memory references and supply memory operands. The AC1 stage calculates two thirty-two bit linear (three operand) addresses per clock (four operand addresses, which are relatively infrequent, take two clocks). During this pipe stage, data dependencies are also checked and resolved using the register translation unit 25a (register scoreboard and register renaming hardware)—the thirty-two physical registers 24 are used to map the eight general purpose programmer visible logical registers defined in the x86 architecture (EAX, EBX, ECX, EDX, EDI, ESI, EBP, ESP). During the AC2 stage, the register file 24 and the unified cache 60 are accessed with the physical address (for cache hits, cache access time for the dual ported unified cache is the same as that of a register, effectively extending the register set)—the physical address is either the linear The microprocessor 10 supports speculative execution in the case of both branch and floating point instructions. That is, instructions following either a floating point instruction, or a branch for which the BPU 40 has predicted the direction (taken or not taken), are speculatively allowed to proceed in the execution pipelines and complete execution. If a floating point instruction faults (which may be tens or even hundreds of clocks after being issued to the FPU) or if a branch is mispredicted (which will not be known until the EX or WB stage for the branch), then the execution pipeline must be repaired to the point of the faulting or mispredicted instruction (i.e., the execution pipeline is flushed behind that instruction), and instruction fetch restarted.

Pipeline repair is accomplished by creating checkpoints of the machine state at each pipe stage as a floating point or predicted branch instruction enters that stage. For these checkpointed instructions, all resources (programmer visible registers, instruction pointer, condition code register) that can be modified by succeeding speculatively issued instructions are checkpointed. If a checkpointed floating point instruction faults or a checkpointed branch is mispredicted, the execution pipeline is flushed behind the checkpointed instruction—for floating point instructions, this will typically mean flushing the entire execution pipeline, while for a mispredicted branch there may be a paired instruction in EX and two instructions in WB that would be allowed to complete.

For the exemplary microprocessor 10, the principle constraints on the degree of speculation are: (a) speculative execution is allowed for only up to four floating point or branch instructions at a time (i.e., the speculation level is maximum four), and (b) a write or floating point store will not complete to the cache or external memory until the associated branch or floating point instruction has been resolved (i.e., the prediction is correct, or floating point instruction does not fault). address, or if address translation is enabled, a translated address generated by a ATU 50, practiced in accordance with the principles of the present invention.

Translated addresses are generated by the ATU 50 from the linear address using information from page tables in memory and workspace control registers on chip, as will be described in more detail hereinbelow. The unified cache 60 is virtually indexed and physically tagged to permit, when address translation is enabled, set selection with the untranslated address (available at the end of AC1) and, for each set, tag comparison with the translated address from the ATU 50 (available early in AC2). Checks for any segmentation and/or address translation violations are also performed in AC2.

Instructions are kept in program order until it is determined that they will not cause an exception. For most instructions, this determination is made during or before AC2—floating point instructions and certain exclusive instructions may cause exceptions during execution. Instructions are passed in order from AC2 to EX (or in the case of floating point instructions, to the FPU)—because integer instructions that may still cause an exception in EX are designated exclusive, and therefore are issued alone into both execution pipes, handling exceptions in order is ensured.

The execution stages EXx and EXy perform the operations defined by the instruction. Instructions spend a variable number of clocks in EX, i.e., they are allowed to execute out of order (out of order completion). Both EX stages include adder, logical, and shifter functional units, and in addition, the EXx stage contains multiply/divide hardware.

The WB write back stage updates the register file 24, condition codes, and other parts of the machine state with the results of the previously executed instruction.

1.2. System

Referring to FIG. 2, for the exemplary embodiment, microprocessor 10 is used in a processor system that includes a single chip memory and bus controller 82. The memory/bus controller 82 provides the interface between the microprocessor 10 and the external memory subsystem—level two cache 84 and main memory 86—controlling data movement over the sixty-four bit processor data bus PD (the data path is external to the controller which reduces its pin count and cost).

Controller 82 interfaces directly to the thirty-two bit address bus PADDR, and includes a one byte wide data port (not shown) for reading and writing registers within the controller. A bi-directional isolation buffer 88 provides an address interface between microprocessor 10 and VL and ISA buses.

Controller 82 provides control for the VL and ISA bus interface. A VL/ISA interface chip 91 (such as an HT321) provides standard interfaces to a thirty-two bit VL bus and a sixteen bit ISA bus. The ISA bus interfaces to BIOS 92, keyboard controller 93, and I/O chip 94, as well as standard ISA slots 95. The interface chip 91 interfaces to the thirty-two bit VL bus through a bi-directional thirty-two/sixteen multiplexer 96 formed by dual high/low word [31:16]/[15:0] isolation buffers. The VL bus interfaces to standard VL slots 97, and through a bidirectional isolation buffer 98 to the low double word [31:0] of the sixty-four bit processor data bus.

2. Generalized Pipeline Flow

Figure 3:
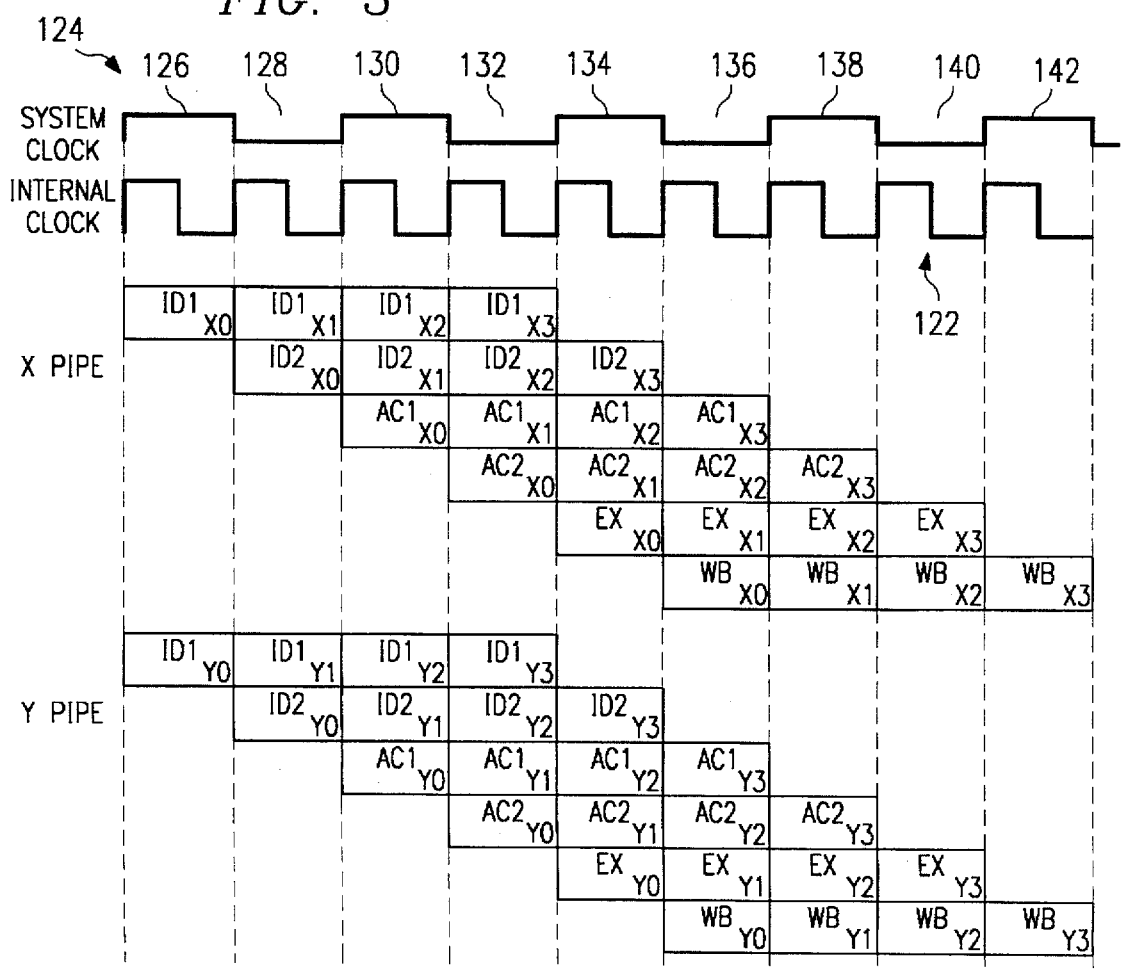
FIG. 3 illustrates a timing diagram depicting the flow of instructions through the pipeline depicted in FIG. 1b.

FIG. 3 illustrates the flow of eight instructions through the pipeline, showing the overlapping execution of the instructions, for a two pipeline architecture. Additional pipelines and additional stages for each pipeline could also be provided without departing from the scope of the present invention. In the preferred embodiment, the microprocessor 10 uses an internal clock 122 which is a multiple of the system clock 124. In FIG. 3, the internal clock is shown as operating at two times the frequency of the system clock. During the first internal clock cycle 126, the ID1 stage operates on respective instructions X0 and Y0. During internal clock cycle 128, instructions X0 and Y0 are in the ID2 stage (X0 being in ID2x and Y0 being in ID2y) and instructions X1 and Y1 are in the ID1 stage. During internal clock cycle 130, instructions X2 and Y2 are in the ID1 stage, instructions X1 and Y1 are in the ID2 stage (X1 being in ID2x and Y1 being in ID2y) and instructions X0 and Y0 are in the AC1 stage (X0 being in AC1x and Y0 being in AC1y). During internal clock cycle 132, instructions X3 and Y3 are in the ID1 stage, instructions X2 and Y2 are in the ID2 stage, instructions X1 and Y1 are in the AC1 stage and instructions X0 and Y0 are in the AC2 stage. The instructions continue to flow sequentially through the stages of the X and Y pipelines. As shown in clocks 134–140, the execution portion of each instruction is performed on sequential clock cycles. This is a major advantage of a pipelined architecture–the number of instructions completed per clock is increased, without reducing the execution time of an individual instruction. Consequently a greater instruction throughput is achieved without requiring greater demands on the speed of the hardware.

The instruction flow shown in FIG. 3 is the optimum case. As shown, no stage requires more than one clock cycle. In an actual machine, however, one or more stages may require additional clock cycles to complete thereby changing the flow of instructions through the other pipe stages. Furthermore, the flow of instructions through one pipeline may be dependent upon the flow of instructions through the other pipeline.

A number of factors may cause delays in various stages of one or all of the pipelines. For example, an access to memory may miss in the memory cache, thereby preventing access of the data in the time required to process the instruction in one clock. This would require that either, or both, sides of the EX stage to delay until the data was retrieved from main memory. For a particular stage, other stages of the pipeline may be using a needed resource, such as a multiplier, which is only in one of the execution stages in the illustrated embodiment. In this case, the stage must delay until the resource is available. Data dependencies can also cause delays. If an instruction needs the result from a previous instruction, such as an ADD, it must wait until that instruction is processed by the execution unit.

Other delays are caused by "multi-box" instructions; i.e., instructions which are implemented using multiple microinstructions, and therefore require more than one clock cycle in the EX pipe stage to complete. These instructions stop the flow of subsequent instructions through the pipeline at the output of the ID2 stage.

The flow of instructions through the pipeline is controlled by the pipe control unit 28. In the preferred embodiment, a single pipe control unit 28 is used to control the flow of instructions through both (or all) of the pipes. To control the flow of instructions through the pipes, the pipe control unit 28 receives "delay" signals from the various units comprising the X and Y pipes, and issues "stall" signals to the various units.

Although a single pipe control unit 28 is used for both X and Y pipelines, the pipelines themselves are controlled independent of one another. In other words, a stall in the X pipeline does not necessarily cause a stall in the Y pipeline.

3. Programmable Page Size Address Translation Unit

Reference is now made to FIG. 5 which illustrates an exemplary embodiment of an ATU 50 practiced in accordance with the principles of the present invention. It should noted at the outset that while two linear addresses (ACX and ACY) are generated, for purposes of clarity, the invention is primarily described with respect to a single linear address. Those skilled in the art will readily recognize general super-scalar principles (as discussed above) to accommodate more than one linear address.

In the preferred embodiment, the ATU 50 comprises a one hundred twenty eight-entry direct-mapped TLB 220, an eight-entry fully associative victim TLB 222, and a four-entry programmable block TLB 224, each of which is a possible source of the physical address during address translation. Those skilled in the art with the aid of this disclosure, will recognize other combinations and configurations for TLBs 220, 222, 224, individually or collectively, without departing from the scope of the present invention. By way of example, TLB 220 could be four-way or fully associative, or it could have two hundred fifty six or more entries. A fourth address source is derived from a conventional tablewalk of the directory table 210 and page table 212 as described herein above. The ATU 50 also preferably includes a fully associative, four-entry DTE cache 211 for caching the most recently used DTEs.

A tablewalk through the directory table 210 and page table 212 occurs if paging is enabled and if the direct-mapped TLB 220, the victim TLB 222, and the block TLB 224 all fail to assert a hit signal (tdhit, tvhit, and tbhit respectively), to the switch control logic 226. The linear address 219 is provided by the respective AC section 22X or 22Y by the end of the AC1 clock (FIG. 3). In response, the ATU 50 generates the physical address before the end of the AC2 clock for comparison with the data cache tag information in TAG RAM 62 (FIG. 1a) to determine whether the current data access has resulted in a hit or miss in the unified cache 60.

The linear address 219 (ACX or ACY) is simultaneously compared to all eight entries in the victim TLB 222, and to the four entries in the programmable block TLB 224 while the direct-mapped TLB 220 is being read. Switch control logic 226 is normally biased to direct physical addresses from the direct-mapped TLB 220 unless of course a miss occurs. If the block TLB 224, the direct TLB 220, or the victim TLB 222 signals a hit, the switch control logic 226 routes the highest order twenty bits of the physical address stored in the respective TLB (220, 222, 224) onto address bus 228a. Otherwise, the switch control logic 226 acquires the default address from the tablewalk. The twelve lowest order bits (the page offset) are driven onto the address bus 228b from the linear address 219. If an overlap in address coverage occurs, the direct TLB 220 takes priority followed by the block TLB 224 and the victim TLB 222.

The DTE cache 211 stores the four most recently used DTEs and employs a strict LRU technique to replace its entries. Those skilled in the art will readily recognize with the aid of the present disclosure, other techniques for replacing entries in the DTE cache 211 without departing from the scope of the present invention. Since in the preferred embodiment two pipes (X and Y) are used, the DTE cache 211 compares both the X and Y requests before evicting any entries. This could be expanded to more pipes without departing from the scope of the present invention. Physical memory 216 is either internal unified cache 60 or level two external cache 84 (FIG. 2), or main DRAM memory 86 (FIG. 2).

3.1. Direct-mapped TLB

Figure 6:
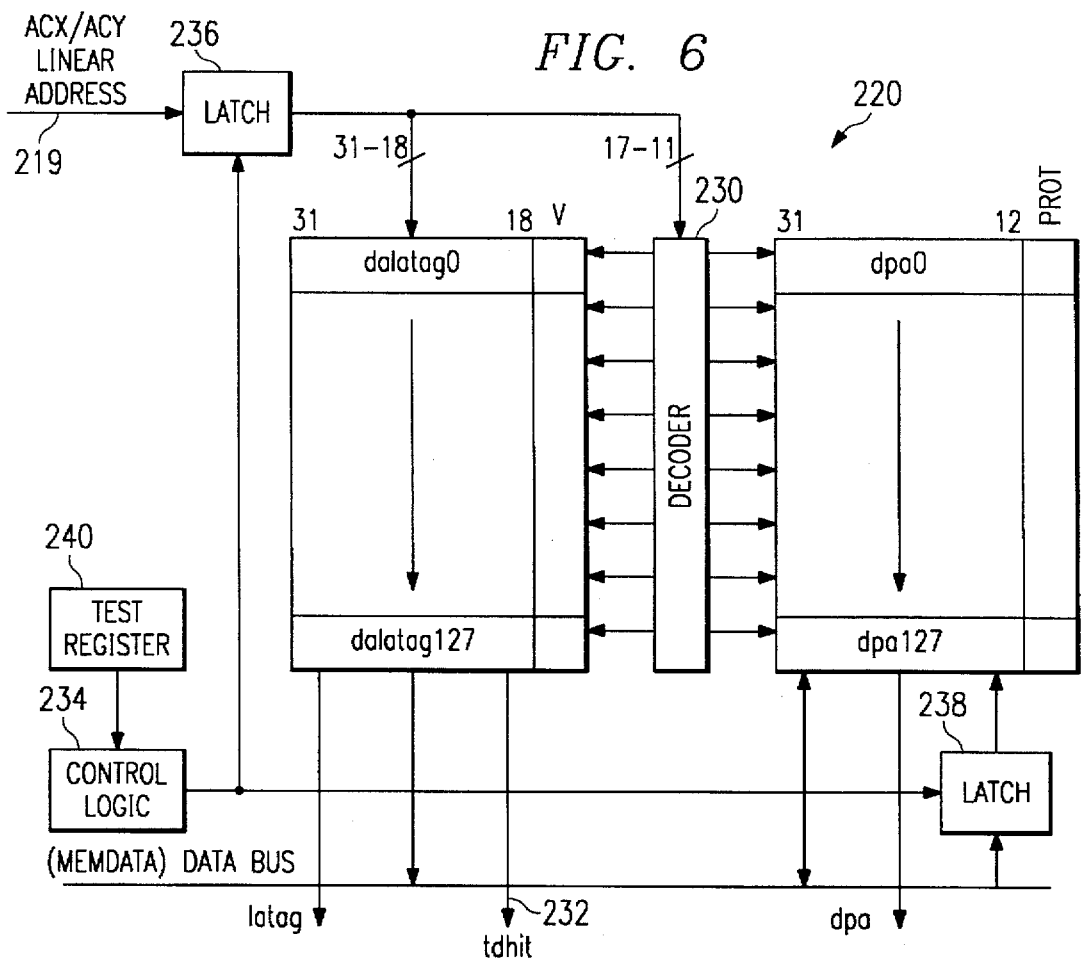
FIG. 6 illustrates the direct-mapped TLB of FIG. 5 in more detail.

Reference is now made to FIG. 6 which illustrates the direct-mapped TLB 220 of FIG. 5 in more detail. In the preferred embodiment, the direct-mapped TLB 220 has one hundred twenty eight entries. The linear address 219 is latched by latch 236 and bits 17–11 are decoded by decoder 230 to select the appropriate entry. Each of the one hundred twenty eight entries in the direct-mapped TLB 220 include a valid bit, a fourteen bit latch dalatag (bits 31–18) for holding the linear address tag, and a twenty bit latch dpa (bits 31–12) for holding the corresponding physical address. The physical address field preferably further includes page protection information (PROT) that is loaded at the same time as the physical address. Latched bits 31–18 of the linear address held in latch 236 are compared to the linear address tag held in the dalatag latch selected by decoder 230. A hit is indicated on hit line tdhit 232 if the tag matches.

The direct-mapped TLB 220 is written to in response to a tablewalk or a victim TLB hit, described in more detail hereinbelow under the victim TLB section. A tablewalk occurs in response to a miss everywhere in the ATU 50 and control logic 234 enables linear address tag latch 236 and physical address tag latch 238 to latch data. Latched bits 11–17 of the linear address are then used as an index to load latched bits 18–31 of the linear address into one of the one hundred twenty eight tag field entries, bits 12–31 on the data bus into one of the 128 physical address entries, and PROT bits into the PROT field.

The direct-mapped TLB 220 can also be written to by a third means of manipulating test register 240. In the preferred embodiment, test register 240 may be a series of test registers and is an artifact of the x86 architecture, the exact details not being necessary for the understanding of the present invention, however which can be found in the CX486DX/DX2 data book, order number 94113-01, from Cyrix Corporation, Richardson, Tex., herein incorporated by reference. Suffice it to say that the linear address tag latch 236 and the physical address tag latch 238 are controlled by test register 240 without a tablewalk and the appropriate entry in the direct-mapped TLB 220 can be read or written to.

3.2. Victim TLB

Figure 7:
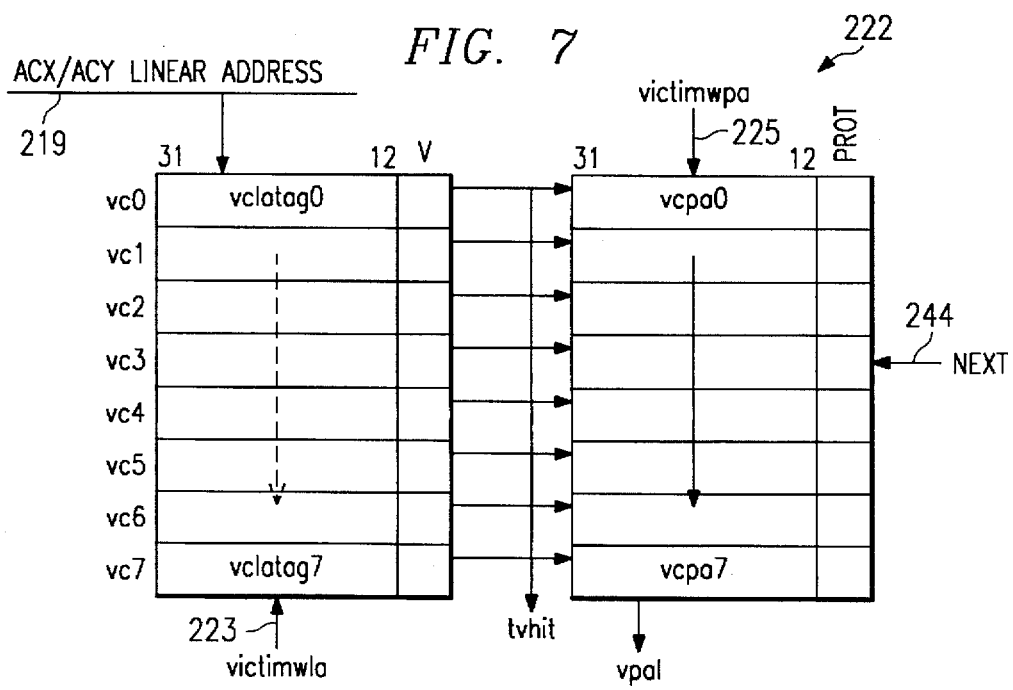
FIG. 7 illustrates the victim TLB of FIG. 5 in more detail.

Reference is now made to FIG. 7 which illustrates the victim TLB 222 of FIG. 5 in more detail. In the preferred embodiment, the victim TLB 222 is an eight-entry, full associative, cache that stores entries which are replaced out of the direct-mapped TLB 220 in a first-in-first-out (FIFO) manner to reduce the negative effects of thrashing, which in the case of the direct-mapped TLB 220, is when more than one page in the current working set aliases to the same entry. It should be appreciated that with the aid of this disclosure, those skilled in the art will readily recognize other configurations for the victim TLB 222 including, but not limited to, additional entries and N-way set configurations without departing from the scope of the present invention.

With an eight entry victim TLB 222, up to nine pages can alias to the same entry in direct-mapped TLB 220 without causing a tablewalk. Each time there is a miss in the direct-mapped TLB 220, the information of the entry selected for replacement is copied to an entry in the victim TLB 222. Each time there is a hit in the victim TLB 222, the entry that hit, in addition to translating the linear address by providing a physical address, is swapped with the entry which was selected and failed to match in the direct-mapped TLB 220.

The entire victim TLB 222 is invalidated (its V bit is set to zero) in the same instances as the direct-mapped TLB 220—at reset and, when the PDBR 214 (FIG. 5) is loaded. A single entry is invalidated in response to the invalidation instruction (INVLPG). The victim TLB 222 is initially invalid, but after eight valid pages have been replaced, all of its entries are valid until the entire victim TLB 222 is next invalidated. Each linear address tag (vclatag0–vclatag7) in the victim TLB 222 includes a valid bit that when set, enables the assertion of the hit signal for that entry. The valid bit (V) is set when the entry is loaded for the first time, and it is cleared on processor reset, when the PDBR 214 is loaded, or in response to an INVLPG instruction.

Each entry in the victim TLB 222 comprise a 20 bit latch (vclatag) for storing the linear address tag, a 20 bit latch (vcpa) for storing corresponding physical addresses, and two comparators (not shown) for comparing the linear addresses of both the X and Y pipes. The physical address latch (vcpa) in the victim TLB 222 also includes a page protection information field (PROT) that is loaded at the same time as the physical address.

When the direct-mapped TLB 220, the victim TLB 222, and the block TLB 224 all indicate a miss, the linear and physical address tags for the entry which was was selected and failed to match in the direct-mapped TLB 220, are driven onto the victimwla 223 and victimwpa 225 buses, respectively. If the valid bit for the entry in the direct-mapped TLB 220 is set, the information is written from that entry into the victim TLB 222 at an entry pointed to by the next pointer 244, regardless of the current contents of that entry in the victim TLB 222. The next pointer 244 is then advanced to point an entry that will be loaded the next time that there is a miss in the direct-mapped TLB 220, the victim TLB 222, and the block TLB 224.

If however, the victim TLB 222 detects a hit, the contents of the victim TLB 222 entry is exchanged (rather than being written over) with the contents of the direct-mapped TLB 220 entry and the next pointer is not affected.

Figure 11:
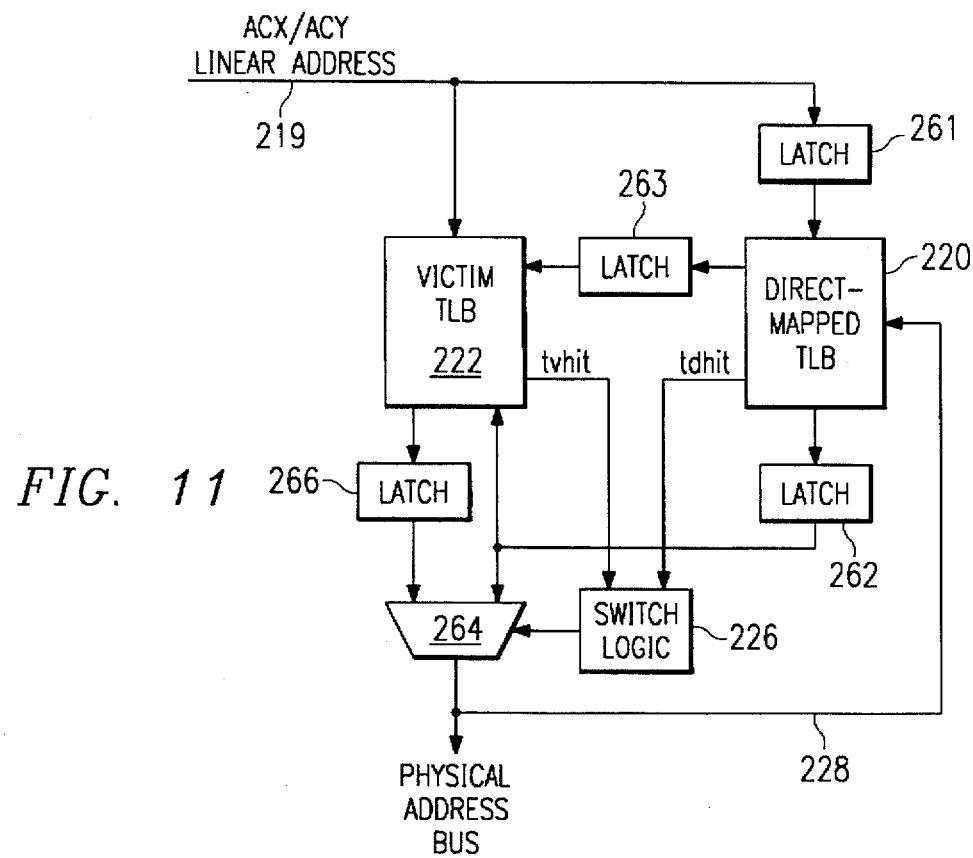
FIG. 11 illustrates the coupling of the direct-mapped TLB and victim TLB in more detail; and, FIG. 12 illustrates a timing diagram of the signals generated by and between the direct-mapped TLB and victim TLB.
Figure 12:
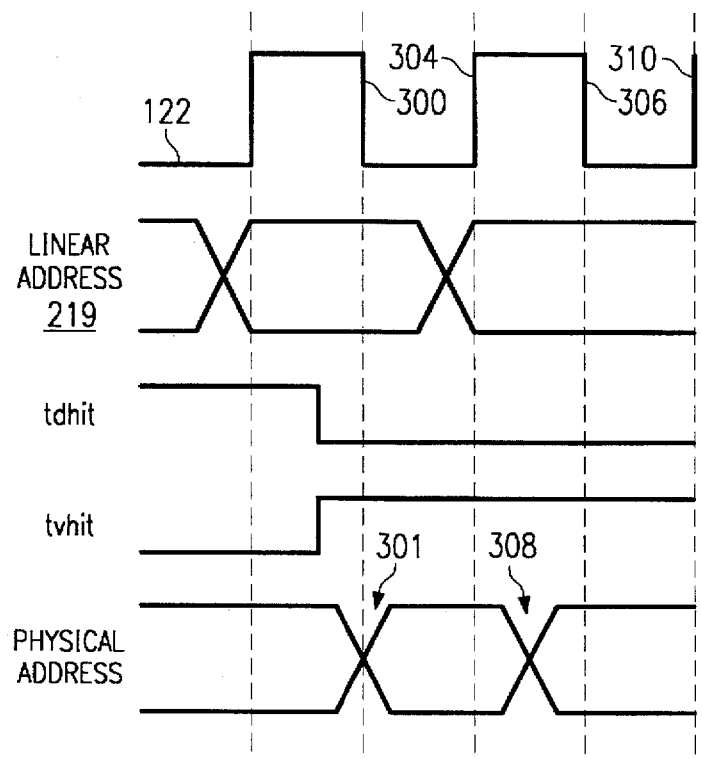

The synergy between the direct mapped TLB 220 and the victim TLB 222 is best understood with reference to FIGS. 11 and 12. FIG. 11 depicts a detailed block diagram of the coupling between the direct-mapped TLB 220 and the victim TLB 222. FIG. 12 depicts a timing diagram of signals generated by and between the direct-mapped TLB 220 and victim TLB 222. The direct mapped TLB 220 and the victim TLB 222 simultaneously receive the linear address 219. On clock edge 300, the direct mapped TLB 220 signals a miss (tdhit is asserted low) and the victim TLB 222 signals a hit (tvhit is asserted high). At point 301, the physical and linear address tags of the entry in the direct-mapped TLB 220 that was selected and failed to match are driven out to latches 262 and 263 respectively. On the subsequent rising clock edge 304, latches 262 and 263 latch the respective address tags for exchange with an entry in the victim TLB 222 and latch 266 latches the physical address that hit in the victim TLB 222 for exchange with the entry that failed to match in the direct-mapped TLB 220.

On clock edge 306, the physical address tag at point 308 is driven from latch 266 (FIG. 11). On clock edge 310, the physical address and linear address tag entries in the victim TLB 222 are updated with the contents of latches 262 and 263, respectively, while the physical address and linear address tag entries in the direct-mapped TLB 220 are updated with the contents of latch 261 and the physical address bus 228, respectively.

3.3. Programmable Block TLB

Figure 8:
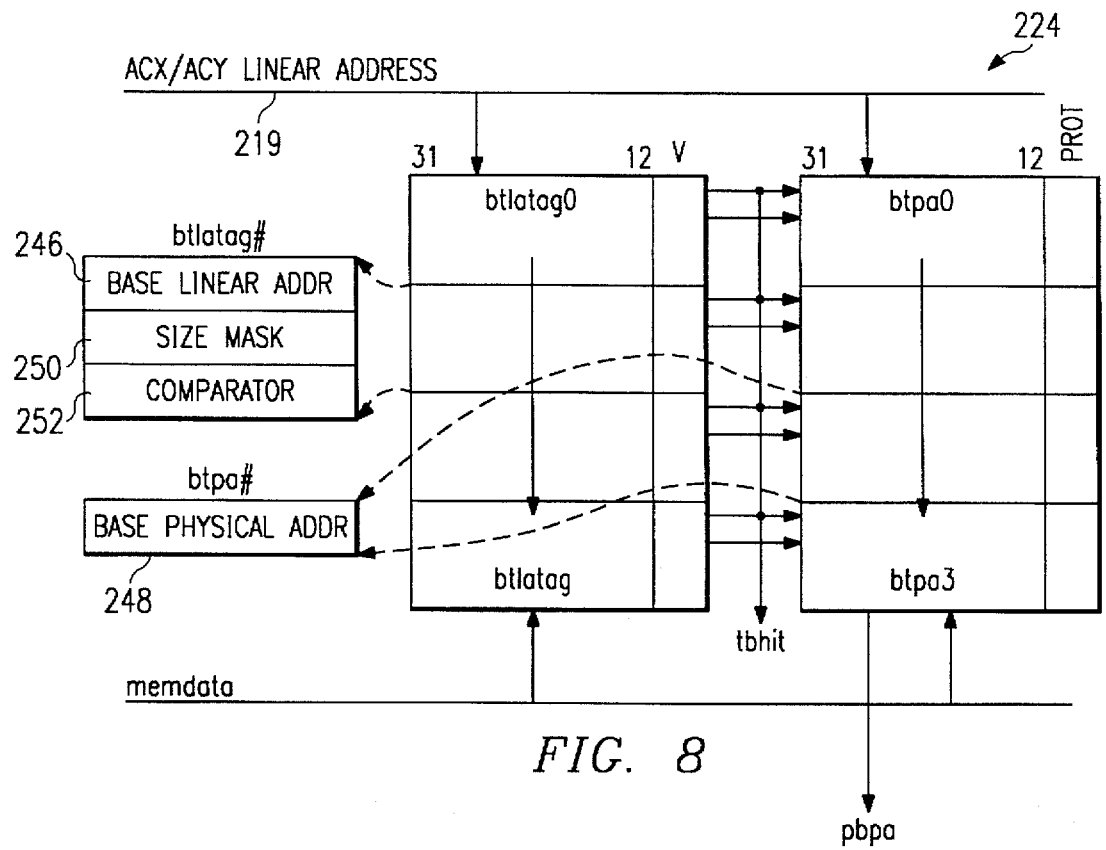
FIG. 8 illustrates the programmable block TLB of FIG. 5 in more detail.

Reference is now made to FIG. 8 which illustrates the programmable block TLB 224 of FIG. 3 in more detail. In the preferred embodiment, the block TLB 224 is a fully associative, four entry cache. With the aid of the present disclosure, those skilled in the art will readily recognize other sizes and configurations without departing from the scope of the present invention. The block TLB 224 is programmably managed through the test register 240 depicted in FIG. 5 and discussed previously hereinabove. Specifically, each entry in the block TLB 224 is programmable with a base linear address 246, a base physical address 248, a block size mask 250, and a page protection information field (PROT). While the range of valid block sizes set by size mask 250 is preferably between four Kilobytes and four Gigabytes, those skilled in the art will recognize other ranges without departing from the scope of the present invention.

The size mask 250 excludes selective bits of the linear address from comparison with the linear tags when determining whether a block hit is detected. All linear address bits that are not used in the comparison are passed on through unchanged as part of the physical address. The block TLB 224 is invalidated at reset and has no address translation effect until at least one of its entries has its valid (V) bit set Each linear tag entry (btlatag) contains four major subsections namely; a twenty bit base linear address 246, a twenty bit mask 250, a twenty bit comparator 252, and a valid bit (V). The btpa register contains the base physical address subsection. In the preferred embodiment, these subsections are programmed through test register 240 discussed herein above. It should be noted however, that those skilled in the art with the aid of this disclosure, will recognize other ways of programming the subsections such as, but not limited to, means analogous to page tables, without departing from the scope of the present invention.

The V bit is set and cleared through test register 240. If a bit in the size mask 250 is set, the corresponding bit of the base linear address 246 is excluded from the comparison by comparator 252. Individual hit signals of the four entries are wired-ORed to form a single hit line (tbhit). Hit line tbhit is coupled to switch control logic 226 depicted in FIG. 5. When a hit is detected in the block TLB 224, the contents of the associated physical address field is driven onto the address bus 228.

In the preferred embodiment, the ATU 50 employs the following priority in the event of multiple hits: 1) programmable block TLB 224, 2) victim TLB 222, and 3) direct-mapped TLB 220. If multiple hits are detected within the TLBs, the highest priority TLB is used and the lower priority TLBs are invalidated. For example, if hits are detected in all three TLBs at the same time, the physical address in the programmable block TLB 224 is used while the overlapping entries in the victim TLB 222 and the direct-mapped TLB 220 are marked invalid to prevent further overlapping hits. Similarly, if hits are detected in both the victim TLB 222 and the direct-mapped TLB 220, the physical address from the victim TLB 222 is used and the entry in tle direct-mapped TLB 220 is marked invalid to prevent further overlapping hits. It should be noted however, that those skilled in the art with the aid of this disclosure, will readily recognize other priority and systems and methods for aliasing checking without departing from the scope of the present invention.

Figure 9:
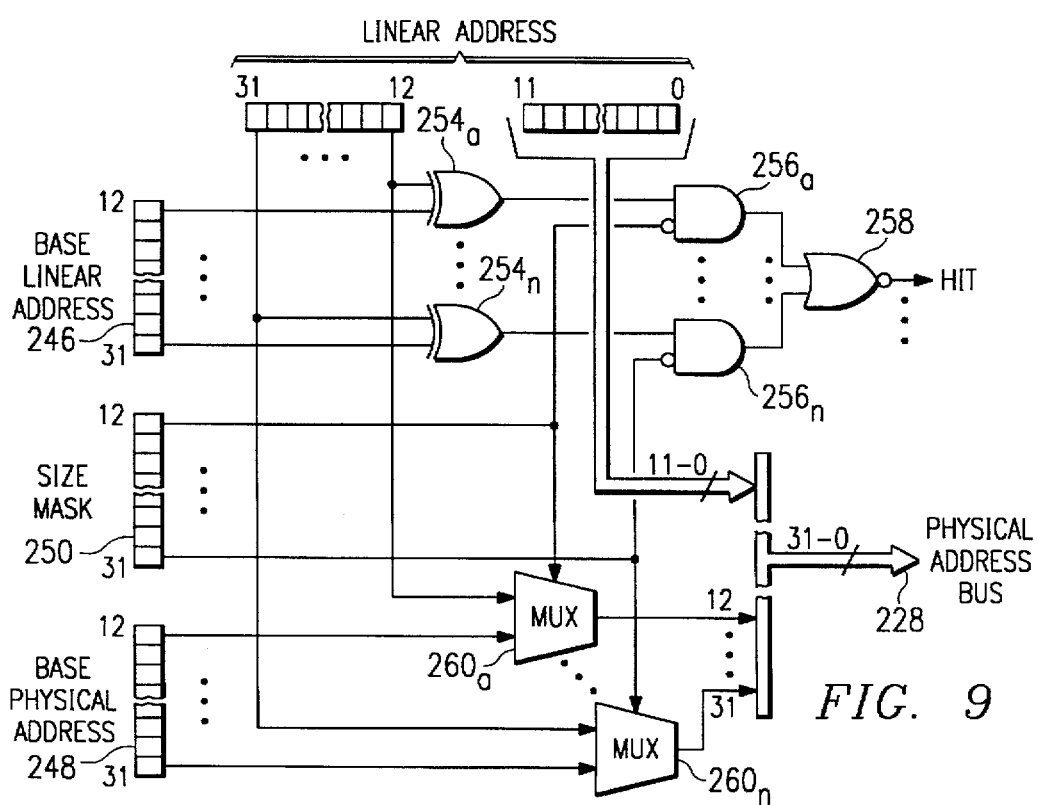
FIG. 9 illustrates an exemplary schematic diagram of an individual entry in the block TLB depicted in FIG. 8.
Figure 10:
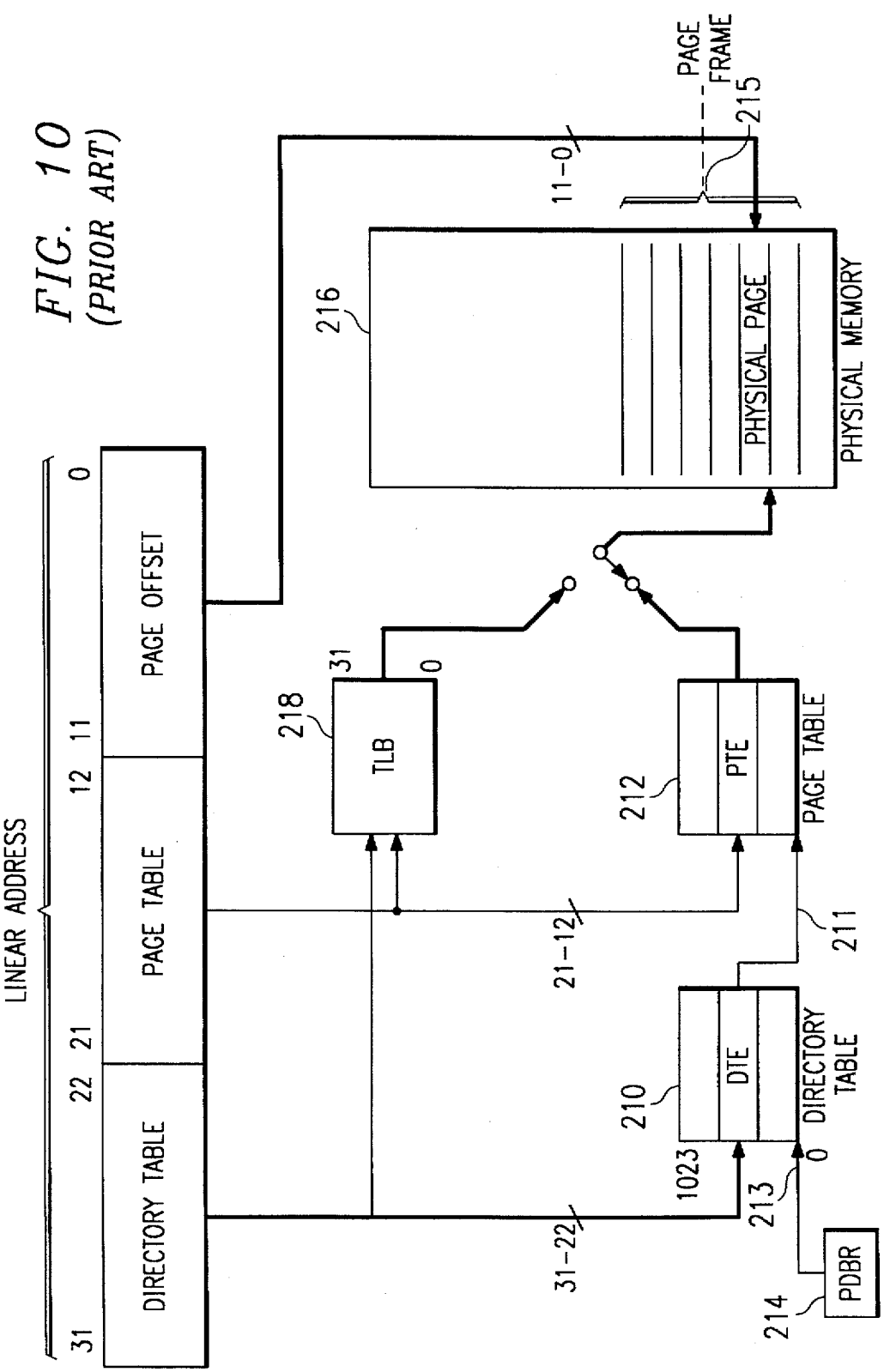
FIG. 10 illustrates a prior art two-level table paging system.

Reference is now made to FIG. 9 which depicts a schematic diagram of an individual entry in the block TLB 224 of FIG. 8. Bits 31–12 of the linear address are logically exclusive-ORed (X0Red) with the base linear address 246 by gates 254a–254n. The outputs of gates 254a–254n are logically ANDed with the inversion of bits 31–12 set in the size mask 250 by AND gates 256a–256n. The outputs of gates 256a–256n are logically NORed together by n-input NOR gate 258 to form a hit signal for the particular entry.

Bits 31–12 of the linear address and bits 31–12 of the base physical address 248 are respectively coupled to the inputs of multiplexers 260a–260n. The outputs of multiplexers 260a–260n form bits 12–31 of the physical address while bits 11–0 of the linear address form bits 11–0. Multiplexers 260a–260n are respectively controlled by bits 31–12 in the size mask 250. If a particular bit is set in the size mask 250, the comparison for that particular bit and the corresponding linear address bit is ignored. The selected multiplexer then passes that particular linear address bit on through as the physical address.

4. Conclusion

Although the Detailed Description of the invention has been directed to certain exemplary embodiments, various modifications of these embodiments, as well as alternative embodiments, will be suggested to those skilled in the art. For example, specific register structures, mappings, bit assignments, cache associations and sizes, and other implementation details are set forth solely for purposes of providing a detailed description of the invention. However, the invention has general applicability to any virtual memory addressing system or method. Various modifications based on trade-offs between hardware and software logic will be apparent to those skilled in the art. Also, the specific address nomenclature (linear address, effective address, segment base, relative base, etc.) is conventional for the x86 architecture, and is used for the purpose of describing the exemplary embodiment only. The invention encompasses any modifications or alternative embodiments that fall within the scope of the Claims.

What is claimed is:

1. An address translation unit for translating a linear address on a linear address bus to a physical address on a physical address bus comprising:

(a) a direct-mapped translation lookaside buffer having a plurality entries, each entry containing a linear address tag and a physical address, a hit signal to indicate a match between an address on the linear address bus and one of the linear address tags, and an output for providing the physical address in response to a match with one of the plurality of linear address tags;

(b) a victim translation lookaside buffer having a plurality entries each having a linear address tag and a physical address and coupled to receive contents of evicted entries from the direct-mapped translation lookaside buffer, a hit signal to indicate a match between an address on the linear address bus and one of the linear address tags, and an output for providing the physical address to the physical address bus and to an entry in the direct-mapped translation lookaside buffer in response to a match with one of the plurality of linear address tags; and, (c) switch means, coupled to the direct-mapped translation lookaside buffer output and the victim translation lookaside buffer output, for routing the physical address onto the physical address bus responsive to one of the hit signals in the direct-mapped translation lookaside buffer and the victim translation lookaside buffer, respectively.

2. The address translation unit of claim 1 further comprising:

(d) first and second latches, coupled between the direct-mapped and victim translation lookaside buffers, to latch the linear address tag and the physical address of the direct-mapped translation lookaside buffer in response to a miss in the direct-mapped translation lookaside buffer; and (e) a third latch, coupled between the victim translation lookaside buffer and the switch means, to latch the physical address of the victim translation lookaside buffer in response to a hit in the victim translation lookaside buffer.

3. The address translation unit of claim 1 wherein during a first clock cycle, the switch means is biased to route a physical address from the direct-mapped translation lookaside buffer to the physical address bus, but during a second clock cycle in response to a miss in the direct-mapped translation lookaside buffer and a hit in the victim translation lookaside buffer, a physical address is routed from the victim translation lookaside buffer to the physical address bus.

4. The address translation unit of claim 1 wherein the victim translation lookaside buffer is fully associative.

5. The address translation unit of claim 1 wherein the direct-mapped translation lookaside buffer and the victim translation lookaside buffer are invalidated in response to writing to a page directory base register.

6. The address translation unit of claim 1 wherein in response to execution of a single entry invalidation instruction, a single entry in either the direct mapped translation lookaside buffer or the victim translation lookaside buffer is invalidated in response to a hit therein.

7. In a system employing direct-mapped and victim translation lookaside buffers, a method of address translation comprising steps of:
  (a) receiving physical addresses from the direct-mapped translation lookaside buffer unless a miss occurs; and,
  (b) in response to a hit in the victim translation lookaside buffer,
    (i) delivering a physical address to a physical address bus, and,
    (ii) swapping the physical address and an associated linear address tag from the victim translation lookaside buffer with a physical address and an associated linear address tag from an entry which failed to hit in the direct-mapped translation lookaside buffer.

8. A method of address translation as recited in claim 7 further comprising the step of invalidating the direct-mapped translation lookaside buffer and the victim translation lookaside buffer in response to writing a page directory base register.

9. A method of address translation as recited in claim 7 further comprising the step of invalidating a single entry in either the direct mapped translation lookaside buffer or the victim translation lookaside buffer in response to executing a single entry invalidation instruction.

10. In a virtual addressing system having a linear address bus and a physical address bus, an address translation unit comprising:
  (a) direct-mapped translation lookaside means, having a plurality entries each containing a linear address tag and a physical address, a hit signal to indicate a match between an address on the linear address bus and one of the linear address tags, for providing the physical address in response to a match with one of the linear address tags;
  (b) victim translation lookaside means, having a plurality entries coupled to receive evicted entries from the direct-mapped translation lookaside means, a hit signal to indicate a match between an address on the linear address bus and one of the linear address tags, for providing the physical address to an entry in the direct-mapped translation lookaside means and to the physical address bus in response to a match with a linear address tag in the victim translation lookaside means; and,
  (c) switch means, coupled to the direct-mapped translation lookaside means and the victim translation lookaside buffer means, for routing the physical address onto the physical address bus responsive to one of the hit signals in the direct-mapped translation lookaside means and the victim translation lookaside means, respectively.

11. The address translation unit of claim 1 wherein during a first clock cycle, the switch means is biased to route a physical address from the direct-mapped translation lookaside means to the physical address bus, but in response to a miss in the direct-mapped translation lookaside buffer and a hit in the victim translation lookaside buffer, a physical address is routed from the victim translation lookaside buffer to the physical address bus during a second clock cycle.

12. The address translation unit of claim 10 wherein the victim translation lookaside means is fully associative.

13. The address translation unit of claim 10 wherein the direct-mapped translation lookaside means and the victim translation lookaside means are invalidated in response to writing to a page directory base register.

14. The address translation unit of claim 10 wherein in response to execution of a single entry invalidation instruction, a single entry in the direct mapped translation lookaside means or the victim translation lookaside means is invalidated.

* * * * *